P. MacGAHAN.
MEASURING INSTRUMENT.
APPLICATION FILED AUG. 9, 1916.

1,408,110.

Patented Feb. 28, 1922.

WITNESSES:
Fred. A. Lind
J H Procter

INVENTOR
Paul MacGahan
BY
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

MEASURING INSTRUMENT.

1,408,110.  Specification of Letters Patent.  Patented Feb. 28, 1922.

Application filed August 9, 1916. Serial No. 113,959.

*To all whom it may concern:*

Be it known that I, PAUL MACGAHAN, a citizen of the United States, and a resident of Pittsburgh, in the county of Allegheny and State of Pennsylvania, have invented a new and useful Improvement in Measuring Instruments, of which the following is a specification.

My invention relates to measuring instruments and particularly to accelerometers and grade-indicating instruments that are employed on vehicles.

The object of my invention is to provide a device of the above indicated character that shall be simple in design, cheap to construct and accurate in operation.

In the carrying out of my invention, I provide a movable magnetizable member, a stationary permanent magnet for yieldingly holding the magnetizable member normally in a predetermined position and a pivotally-mounted magnet that is adapted to be normally disposed in such position with respect to the magnetizable member that it does not affect the same. The pivotally-mounted magnet is adapted to assume various positions in accordance with the acceleration of the vehicle to which the device is connected and in accordance with the percent grade over which the vehicle is moving. When the pivotally-mounted magnet is moved from its normal position, it attracts the magnetizable member in accordance with the distance that it is moved to indicate the acceleration of the vehicle or the percent grade over which the vehicle is moving.

Figure 1:
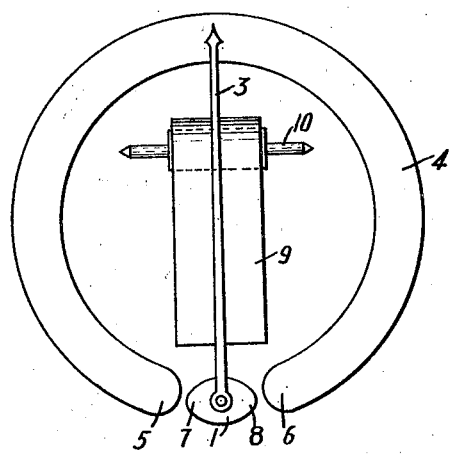
Figure 2:
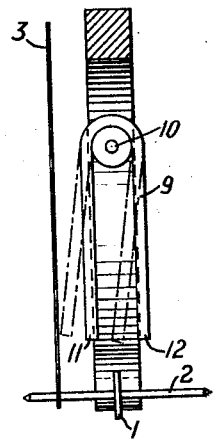

In the accompanying drawings, Fig. 1 is a front elevational view of an instrument embodying my invention, and Fig. 2 is a side view, partially in section and partially in elevation, of the instrument shown in Fig. 1.

A movable magnetizable member 1 is mounted on a shaft 2 upon which a pointer 3 is also mounted. A stationary permanent magnet 4 is so disposed that its poles 5 and 6 are normally adjacent the poles 7 and 8 of the magnetizable member 1 to thus yieldingly hold the magnetizable member 1 normally in a predetermined position. A permanent magnet 9, of substantially U-shape, is pivotally mounted on a shaft 10 and is adapted to normally assume such position that its poles 11 and 12 attract the magnetizable member 1 equally in opposite directions. Thus, the member 1 will remain in the position shown in the drawings, under normal conditions.

If the device, above described, is mounted on a vehicle (not shown) in such manner that the permanent magnet 9 is permitted, because of its relative difference in inertia, to assume various positions in accordance with the acceleration of the vehicle and the percent grade over which the vehicle is moving, it will be seen that, if its poles 11 and 12 assume the positions shown in the broken lines in Fig. 2 of the drawings, for example, one of the poles 7 and 8 of the magnetizable member 1 will be attracted to cause the pointer 3 to turn an amount proportional to the angular movement of the magnet 9. That is, the magnet 9 will be displaced from its normal position an amount proportional to the acceleration of the vehicle to which it is connected or in accordance with the percent grade over which the vehicle is moving, and it will actuate the movable member 1 and, consequently, the pointer 3, in proportion to its displacement.

I do not limit my invention to the particular structure illustrated, as many modifications may be made therein without departing from the spirit and scope of the invention as set forth in the appended claims.

I claim as my invention:

1. A measuring instrument comprising a stationary permanent magnet, a movable magnetizable member adapted to be normally held in a predetermined position by the stationary permanent magnet and a pivotally-mounted permanent magnet adapted to attract the movable magnetizable member in accordance with predetermined conditions.

2. A measuring instrument comprising a movable magnetizable member, means for normally holding the same in a predetermined position, and a pivotally-mounted permanent magnet for assuming various positions with respect to the movable magnetizable member under predetermined conditions, said movable magnetizable member being adapted to be attracted by the permanent magnet in accordance with its position.

3. An accelerometer for a vehicle comprising a movable magnetizable member, means for normally holding the same in a predetermined position, and a movable permanent magnet for assuming various positions in accordance with the acceleration of the vehicle to which it is connected, said permanent magnet being adapted to actuate the magnetizable member in accordance with its position.

4. A measuring instrument comprising a movable magnetizable member, a magnet for normally holding the same in a predetermined position and a magnet mounted to move responsive to acceleration and inclination for attracting the movable magnetizable member in accordance with the movements of the movable magnet.

5. An accelerometer for a vehicle comprising a movable magnetizable member, magnetic means for normally holding the same in a predetermined position, and a movable magnet adapted to be displaced with respect to the magnetizable member in accordance with the acceleration of the vehicle to which it is connected to actuate the magnetizable member.

6. An accelerometer for a vehicle comprising a movable magnetizable member, magnetic means for normally holding the same in a predetermined position and a movable magnet that serves to actuate said magnetizable member only when it is displaced by reason of the acceleration of the vehicle to which it is connected.

7. An accelerometer for a vehicle comprising a movable magnetizable member, means for opposing the movement thereof, and a pivotally-mounted magnet normally so disposed with respect to the magnetizable member as to exert a zero actuating force thereupon but adapted to actuate the magnetizable member in accordance with the acceleration of the vehicle to which it is connected.

8. A measuring instrument comprising a movable magnetizable member, a pivotally-mounted permanent magnet of substantially U-shape, and means for holding the magnetizable member between the poles of the permanent magnet and at substantially right angles thereto, said magnet being adapted to turn in accordance with predetermined conditions and to actuate the magnetizable member in accordance with the amount that it is turned.

9. An accelerometer for a vehicle comprising a movable magnetizable member, a magnet for normally holding the movable member in a predetermined position, and a permanent magnet adapted to be displaced with respect to the movable member in accordance with the acceleration of the vehicle, said permanent magnet being adapted to actuate the first movable member in accordance with its position.

10. A measuring instrument comprising a movable magnetizable member, a magnet for normally holding the same in a predetermined position, and a pivotally-mounted permanent magnet adapted to attract the movable magnetizable member in accordance with changes in inclination and acceleration of a carrier therefor.

In testimony whereof, I have hereunto subscribed my name this 20th day of July, 1916.

PAUL MacGAHAN.